US011860762B2

(12) United States Patent
Jada et al.

(10) Patent No.: US 11,860,762 B2
(45) Date of Patent: Jan. 2, 2024

(54) SEMICONDUCTOR DEVICE, CONTROL FLOW INSPECTION METHOD, NON-TRANSITORY COMPUTER READABLE MEDIUM, AND ELECTRONIC DEVICE

(71) Applicant: NEC Corporation, Tokyo (JP)

(72) Inventors: Astha Jada, Tokyo (JP); Toshiki Kobayashi, Tokyo (JP); Takayuki Sasaki, Tokyo (JP); Daniele Enrico Asoni, Zurich (CH); Adrian Perrig, Zurich (CH)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 17/618,930

(22) PCT Filed: Jun. 25, 2019

(86) PCT No.: PCT/JP2019/025133
§ 371 (c)(1),
(2) Date: Dec. 14, 2021

(87) PCT Pub. No.: WO2020/261377
PCT Pub. Date: Dec. 30, 2020

(65) Prior Publication Data
US 2022/0245054 A1 Aug. 4, 2022

(51) Int. Cl.
*G06F 9/44* (2018.01)
*G06F 11/36* (2006.01)
(52) U.S. Cl.
CPC ...... *G06F 11/3612* (2013.01); *G06F 11/3688* (2013.01)

(58) Field of Classification Search
CPC .................. G06F 11/3612; G06F 11/3688
See application file for complete search history.

(56) References Cited

U.S. PATENT DOCUMENTS

| 5,940,857 A | 8/1999 | Nakanishi et al. |
| 2004/0193856 A1* | 9/2004 | Wang ................ G06F 9/3848 712/238 |

(Continued)

FOREIGN PATENT DOCUMENTS

| EP | 2963560 A1 | 1/2016 |
| JP | H08-123723 A | 5/1996 |
| JP | 2011-055117 A | 3/2011 |

OTHER PUBLICATIONS

International Search Report for PCT Application No. PCT/JP2019/025133, dated Oct. 1, 2019.

(Continued)

*Primary Examiner* — Hang Pan

(57) ABSTRACT

A semiconductor device (100) includes: first storage means (110) storing, in advance, a plurality of pieces of execution order inspection information (111~11n) used for inspection of an execution order of a plurality of code blocks in a predetermined program, second storage means (120), which is a cache for the first storage means, and prediction means (130) for predicting a storage area of the execution order inspection information based on prediction auxiliary information in a first code block of the plurality of code blocks and a control flow graph of the program, the storage area being a prefetch target to be prefetched from the first storage means to the second storage means.

12 Claims, 11 Drawing Sheets

(56) References Cited

U.S. PATENT DOCUMENTS

2008/0005208 A1* 1/2008 Vaswani ............ G06F 11/3466
2009/0282474 A1 11/2009 Chen et al.
2010/0293407 A1 11/2010 Locasto et al.
2015/0331691 A1* 11/2015 Levitan ................ G06F 9/3861
 712/240
2017/0083319 A1* 3/2017 Burger ................. G06F 9/3824
2019/0121716 A1 4/2019 Kurmus et al.

OTHER PUBLICATIONS

Japanese Office Action for JP Application No. 2021-528697, dated Feb. 14, 2023 with English Translation.

* cited by examiner

SEMICONDUCTOR DEVICE, CONTROL FLOW INSPECTION METHOD, NON-TRANSITORY COMPUTER READABLE MEDIUM, AND ELECTRONIC DEVICE

This application is a National Stage Entry of PCT/JP2019/025133 filed on Jun. 25, 2019, the contents of all of which are incorporated herein by reference, in their entirety.

TECHNICAL FIELD

The present disclosure relates to a semiconductor device, a control flow inspection method, and a non-transitory computer readable medium storing a control flow inspection program.

BACKGROUND ART

Inspection of Control Flow Integrity (CFI) is a technique for inspecting whether a control flow is correct during execution of a program. Techniques that use CFI include, for example, Patent Literature 1. Patent Literature 1 discloses a technique related to a system for safely executing an untrusted native code on a computer device with performance substantially similar to trusted native code.

CITATION LIST

Patent Literature

[Patent Literature 1] European Patent Application Publication No. 2963560

SUMMARY OF INVENTION

Technical Problem

When CFI inspection is performed during execution of a program to maintain device security, detailed processing is usually required, and overhead (net execution cost) is high. Therefore, Patent Literature 1 has a problem that it is difficult to reduce processing overhead while maintaining device security.

The present disclosure has been made in order to solve the aforementioned problem and the aim of the present disclosure is to provide a semiconductor device, a control flow inspection method, and a non-transitory computer readable medium storing a control flow inspection program for reducing processing overhead while maintaining device security.

Solution to Problem

A semiconductor device according to a first aspect of the present disclosure includes:
  first storage means for storing, in advance, a plurality of pieces of execution order inspection information used for inspection of an execution order of a plurality of code blocks in a predetermined program; and
  second storage means, which is a cache for the first storage means; and
  prediction means for predicting a storage area of the execution order inspection information based on prediction auxiliary information in a first code block of the plurality of code blocks and a control flow graph of the program, the storage area being a prefetch target to be prefetched from the first storage means to the second storage means.

In a control flow inspection method according to a second aspect of the present disclosure, a computer including:
  first storage means for storing, in advance, a plurality of pieces of execution order inspection information used for inspection of an execution order of a plurality of code blocks in a predetermined program; and
  second storage means, which is a cache for the first storage means,
  acquires prediction auxiliary information in a first code block of the plurality of code blocks and a control flow graph of the program; and
  predicts a storage area of the execution order inspection information based on the prediction auxiliary information and the control flow graph, the storage area being a prefetch target to be prefetched from the first storage means to the second storage means.

A non-transitory computer readable medium storing a control flow inspection program according to a third aspect of the present disclosure causes a computer including:
  first storage means for storing, in advance, a plurality of pieces of execution order inspection information used for inspection of an execution order of a plurality of code blocks in a predetermined program; and
  second storage means, which is a cache for the first storage means, to execute:
  processing of acquiring prediction auxiliary information in a first code block of the plurality of code blocks and a control flow graph of the program; and
  processing of predicting a storage area of the execution order inspection information based on the prediction auxiliary information and the control flow graph, the storage area being a prefetch target to be prefetched from the first storage means to the second storage means.

Advantageous Effects of Invention

According to the aforementioned aspects, it is possible to provide a semiconductor device, a control flow inspection method, and a non-transitory computer readable medium storing a control flow inspection program for reducing processing overhead while maintaining device security.

DESCRIPTION OF EMBODIMENTS

Hereinafter, with reference to the drawings, example embodiments of the present disclosure will be described in detail. Throughout the drawings, the same or corresponding elements are denoted by the same symbols and overlapping descriptions will be omitted as necessary for the sake of clarification of the description.

First Example Embodiment

Figure 1:
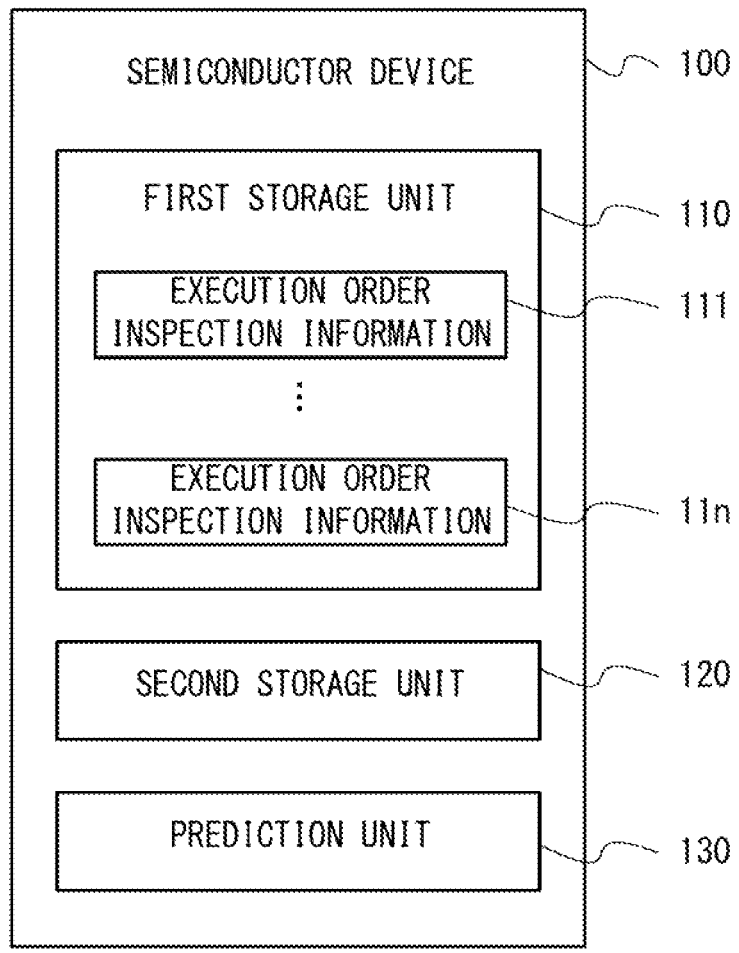
FIG. 1 is a block diagram showing a configuration of a semiconductor device according to a first example embodiment.

FIG. 1 is a block diagram showing a configuration of a semiconductor device 100 according to a first example embodiment. The semiconductor device 100 is a control apparatus or an information processing apparatus such as a processor that controls execution of a predetermined program. Further, the semiconductor device 100 may be mounted on an electronic device such as a computer or an information processing apparatus, or an Internet of Thing (IoT) device or an embedded device. The semiconductor device 100 includes a first storage unit 110, a second storage unit 120, and a prediction unit 130.

The first storage unit 110 is a storage apparatus storing a plurality of pieces of execution order inspection information 111 to 11n (n is a natural number equal to or larger than two) in advance. The execution order inspection information 111 and so on are information used for inspection of an execution order of a plurality of code blocks in a predetermined program. In other words, the execution order inspection information 111 and so on are information for specifying an execution order of a plurality of code blocks in a predetermined program. For example, the execution order inspection information 111 and so on are, but not limited to, numerical information indicating an execution order of a plurality of code blocks in a predetermined program, a hash value calculated based on an execution order, a code block or the like.

The second storage unit 120 is a storage apparatus that operates faster than the first storage unit 110 and serves as a cache for the first storage unit 110. Therefore, at least a part of the information in the first storage unit 110 is prefetched to the second storage unit 120.

Further, when, for example, the first storage unit 110 is a hard disk, the second storage unit 120 is a memory or a cache memory. Further, when the first storage unit 110 is a memory, the second storage unit 120 is a cache memory. Note that the examples of the first storage unit 110 and the second storage unit 120 are not limited to them.

The prediction unit 130 predicts a storage area of the execution order inspection information 111 and so on to be prefetched from the first storage unit 110 to the second storage unit 120 based on prediction auxiliary information and a control flow graph of the aforementioned program. Alternatively, it can also be said that the prediction unit 130 determines whether or not the execution order inspection information 111 and so on are to be prefetched. The prediction auxiliary information, which is information in a first code block among the plurality of code blocks, is information for assisting prediction by the prediction unit 130. For example, the prediction auxiliary information includes at least one of input values to the first code block of the plurality of code blocks, internal state variable values when the first code block is executed, and the priority of execution of paths that may be executed after being branched off from the first code block. However, the prediction auxiliary information is not limited to them.

Further, it is assumed that the prediction unit 130 predicts the storage area of the execution order inspection information regarding the execution order that corresponds to the first code block or code blocks that may be executed after the first code block based on the control flow graph as a prefetch target.

Figure 2:
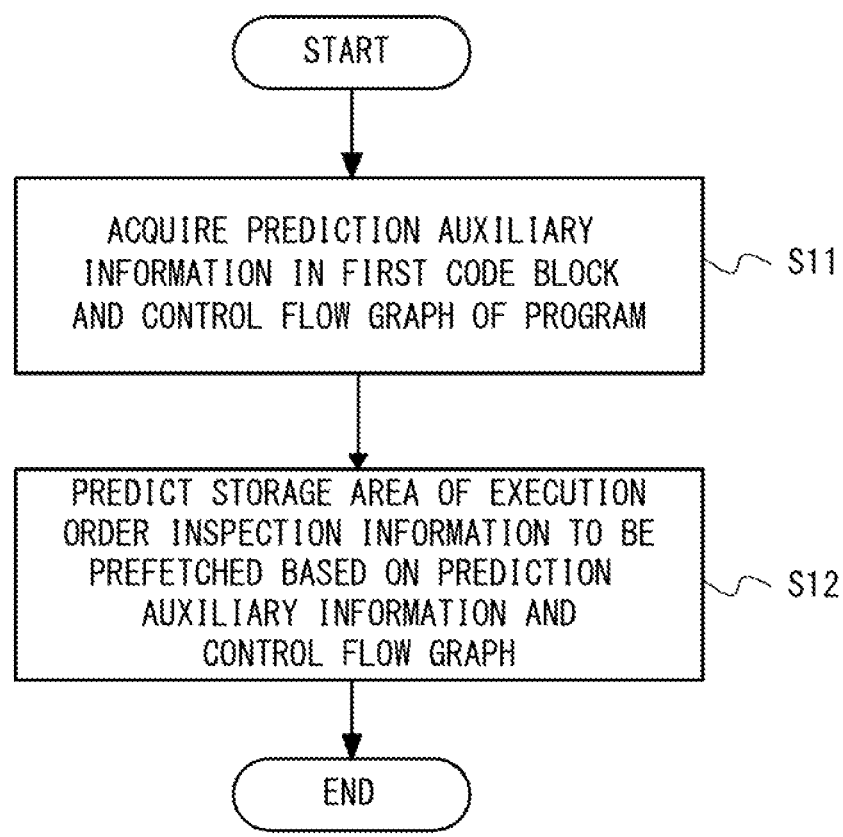
FIG. 2 is a flowchart showing a flow of prediction processing of a control flow inspection method according to the first example embodiment.

FIG. 2 is a flowchart showing a flow of prediction processing of a control flow inspection method according to the first example embodiment. First, the prediction unit 130 acquires the prediction auxiliary information in the first code block among the plurality of code blocks in a predetermined program and the control flow graph of this program (S11). Note that Step S11 may be performed when a predetermined program is executed or before the program execution starts.

Next, the prediction unit 130 predicts the storage area of the execution order inspection information to be prefetched from the first storage unit 110 to the second storage unit 120 based on the prediction auxiliary information and the control flow graph (S12).

Therefore, according to this example embodiment, the storage area of the prefetch target that has been predicted may be prefetched from the first storage unit 110 to the second storage unit 120. As a result, the execution order inspection information that corresponds to the code block that is currently being executed or code blocks that may be executed after this code block is prefetched to the second storage unit 120. Then, when inspection of control flow integrity of a predetermined code block is executed later, an access is made to the second storage unit 120, resulting in a higher probability that execution order inspection information that corresponds to the current execution order can be acquired. Further, in the case of cache hit (when the execution order inspection information has been successfully acquired), it is possible to acquire the execution order inspection information faster than in a case in which an access is made to the first storage unit 110. Therefore, the processing speed for checking control flow integrity of a predetermined code block (processing of comparing the execution order inspection information etc.) is increased as well. Accordingly, with this example embodiment, it is possible to reduce processing overhead while maintaining device security.

Note that the semiconductor device 100 includes, as components that are not shown, a processor, a memory, and another storage apparatus. The other storage apparatus stores a computer program in which the prediction processing of the control flow inspection method according to this example embodiment is implemented. Then, this processor loads a computer program into the memory from the storage apparatus and executes the loaded computer program. Accordingly, the processor implements the function of the prediction unit 130.

Alternatively, the prediction unit 130 may be implemented by dedicated hardware. Further, some or all of the components of the prediction unit 130 may be implemented by general-purpose or dedicated circuitry, processor, or a combination of them. They may be configured using a single chip, or a plurality of chips connected through a bus. Some or all of the components of each apparatus may be implemented by a combination of the above-described circuitry, etc. and a program. Further, a Central Processing Unit (CPU), a Graphics Processing Unit (GPU), a field-programmable gate array (FPGA), an ARM (registered trademark) architecture and so on may be used as a processor.

Second Example Embodiment

A second example embodiment is a specific example of the aforementioned first example embodiment.

Figure 3:
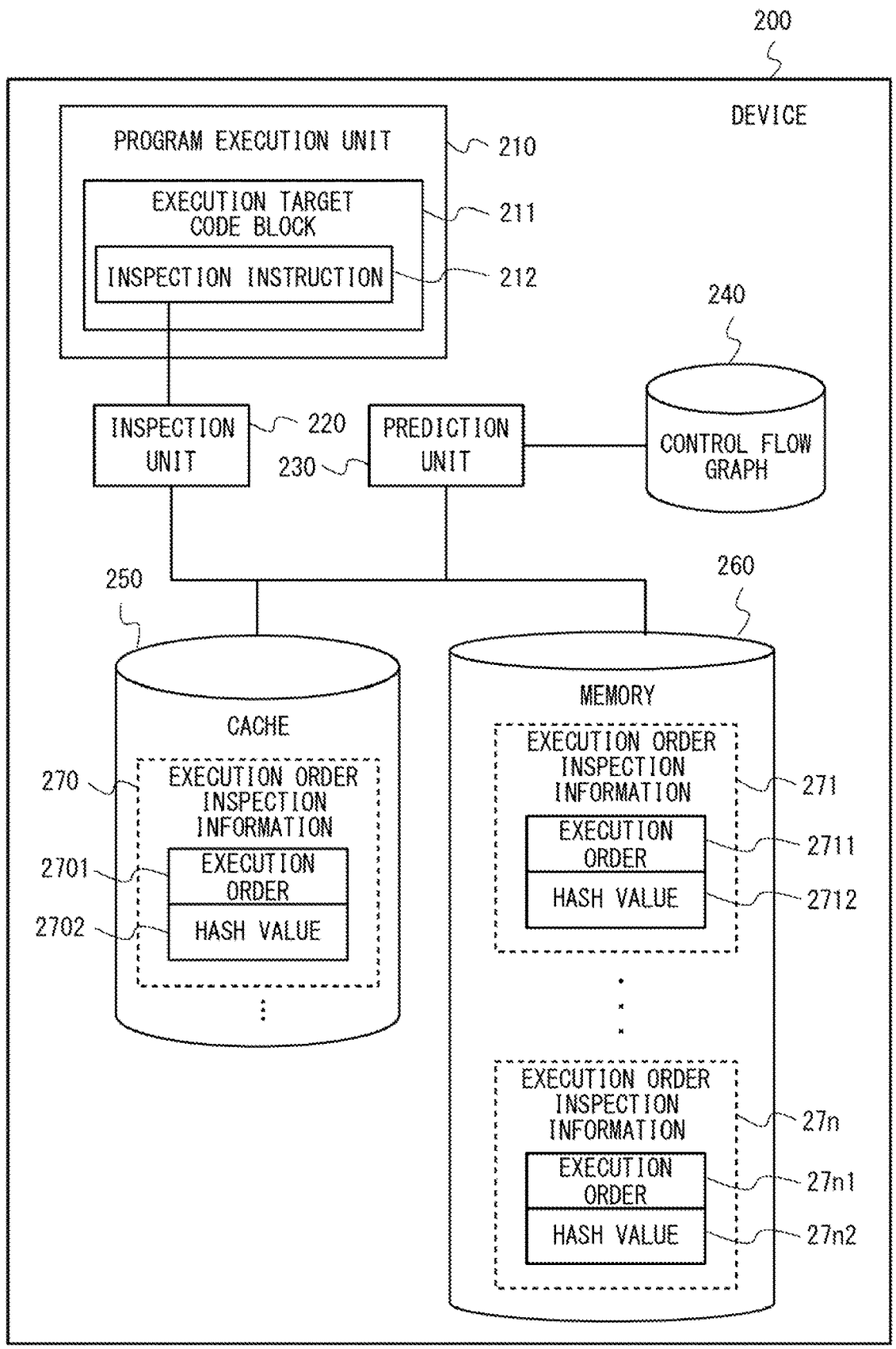
FIG. 3 is a block diagram showing a configuration of a device according to a second example embodiment.

FIG. 3 is a block diagram showing a configuration of a device 200 according to the second example embodiment. The device 200 is one example of the aforementioned semiconductor device 100. The device 200 at least includes a program execution unit 210, an inspection unit 220, a prediction unit 230, a control flow graph 240, a cache 250, and a memory 260.

The program execution unit 210 is a control apparatus that executes an execution target code block 211 in a predetermined program. It can be further said that the program execution unit 210 is a main process for executing a predetermined program. Alternatively, the program execution unit 210 may be, for example, but not limited to, a processor core. The predetermined program is formed of one or more modules and one or more code blocks are implemented in each module. Then, each code block is, for example, a set of program codes of units such as functions. It is further assumed that an inspection instruction 212 of control flow integrity is set in a part of each code block. The inspection instruction 212, which is an instruction for calling the inspection unit 220 that will be described later, is, for example, a function. A plurality of inspection instructions 212 may be set in one code block. It is assumed that the inspection instruction 212 may be set in any position in the code block, such as at the beginning, in the middle, or at the end of the code block. The inspection instruction 212 can be set between code blocks as well. This case is assumed to be equal to a case in which the inspection instruction is set in the end of the code block immediately before the inspection instruction 212 or a case in which the inspection instruction is set at the top of the code block immediately after the inspection instruction 212. The inspection instruction 212 may be implemented on a source code when the program is developed or may be inserted into a binary after compilation.

The inspection unit 220 is implementation of inspection processing that corresponds to the inspection instruction. The inspection unit 220 performs inspection of the control flow integrity regarding the code block that is currently being executed in the program execution unit 210 or a code block that may be executed immediately after the above code block in accordance with the call of the inspection instruction from the program execution unit 210. The inspection unit 220 outputs, when it has been determined in the inspection that there is no problem, information indicating that execution of the subsequent processing of this code block will be allowed to the program execution unit 210 and outputs, when it has been determined in the inspection that there is a problem, information indicating that execution of the subsequent processing of this code block will be blocked to the program execution unit 210. Note that the inspection unit 220 may be implemented as a software process executed on the processor core in the device 200, like the program execution unit 210, or may be implemented as a hardware circuit.

The control flow graph (CFG) 240 is graph information that defines the result of the analysis of the control structure of the program as the flow of control between code blocks. The control flow graph 240, which is stored in the memory 260 or another storage apparatus, functions as a database. The control flow graph 240 is information that defines the position and the execution order of each code block in a program, and defines a link from the code block executed first to the code block to be executed next, a link to a branch destination etc.

Figure 4:
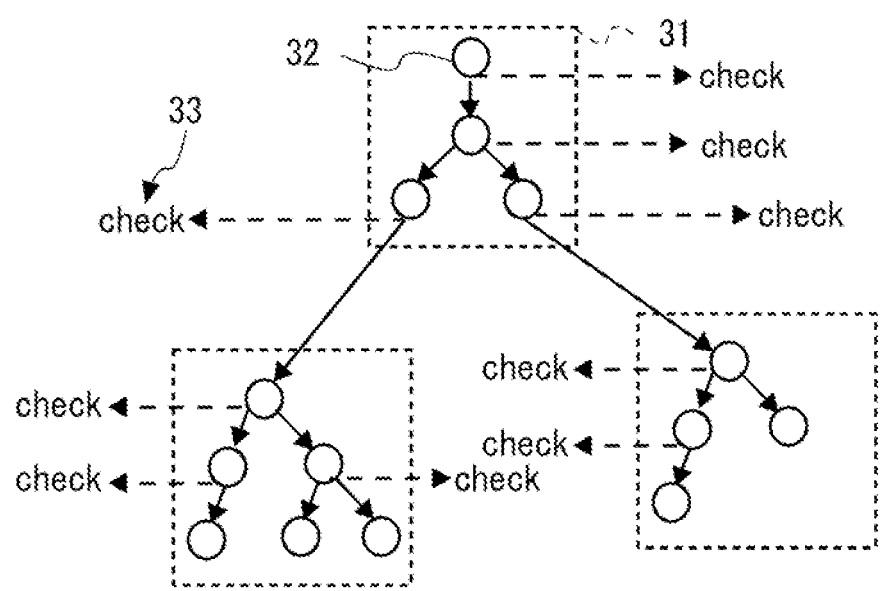
FIG. 4 is a diagram for describing the concept of CFG and CFI inspection according to the second example embodiment.

FIG. 4 is a diagram for describing the concept of the CFG and the CFI inspection according to the second example embodiment. A module 31, which is a set of code blocks, is, for example, a program file or the like. A code block 32, which is a set of one or more program codes, is, for example, a function or the like. An inspection instruction 33, which is an inspection instruction set in a code block, conceptually indicates that the inspection unit 220 has been called.

Referring once again to FIG. 3, the explanation will be continued. The memory 260, which is one example of the aforementioned first storage unit 110, is, for example, a Random Access Memory (RAM). The memory 260 stores all the pieces of execution order inspection information 271 to 27n that correspond to the respective code blocks in the control flow graph 240. In the execution order inspection information 271, an execution order 2711 and a hash value 2712 are associated with each other. The hash value 2712 is a value calculated by a predetermined hash function from a numerical value indicating the execution order 2711 in a specific code block. Likewise, in the execution order inspection information 27n, an execution order 27n1 and a hash value 27n2 are associated with each other. Note that the execution order inspection information may include any one of a hash value calculated based on a path of the control flow regarding two or more of a plurality of code blocks, the execution order itself, a set of execution orders and the like. For example, the hash value 2712 may be a value calculated by a predetermined hash function from a set of the path of the control flow of two or more code blocks and the number of the execution order. Alternatively, the execution order inspection information 271 may not use the hash value 2712 and may be the execution order 2711 itself.

The cache 250 is one example of the aforementioned second storage unit 120. The cache 250 is, for example, a cache memory that operates faster than the memory 260. The cache 250 stores the execution order inspection information 270 and the like. It is further assumed that the cache 250 stores at least one of the pieces of execution order inspection information 271 to 27n in the memory 260.

The prediction unit 230 is one example of the aforementioned prediction unit 130. The prediction unit 230 is implementation of prediction processing of a part of inspection processing performed by the inspection unit 220. Therefore, the prediction unit 230 may be implemented as a software process executed on the processor core in the device 200 or may be implemented as a hardware circuit.

The prediction unit 230 specifies the second code block that may be executed after the first code block based on the prediction auxiliary information and the control flow graph 240, and specifies the path of the control flow from the first code block to the second code block. Then, the prediction unit 230 predicts the storage area of the execution order inspection information that corresponds to the specified path as the prefetch target. Accordingly, it is possible to prefetch the execution order inspection information that corresponds to each of a plurality of code blocks included in the path and the cache hit rate of the execution order inspection information may be improved.

It is assumed here that the prediction auxiliary information includes at least one of the input values to the first code block, the internal state variable values when the first code block is executed, and the priority of execution of the paths that may be executed after being branched off from the first code block.

Further, the prediction unit 230 may specify a first position of the first code block in the program based on the control flow graph 240 and specify a second position included in the control flow from the first position as the second code block based on the result of the analysis of the prediction auxiliary information and the control flow graph. It is therefore possible to specify the path more appropriately.

Further, the prediction unit 230 may predict, when the execution frequency of the specified path is higher than those of other paths that may be executed by being branched off from the first code block, the storage area of the execution order inspection information that corresponds to the specified path as the prefetch target. Accordingly, the cache hit rate of the execution order inspection information may be improved.

Further, the prediction unit 230 may predict, when the number of code blocks included in the specified path is equal to or larger than a predetermined value, the storage area of the execution order inspection information that corresponds to the specified path as a prefetch target. According to this procedure, the execution order inspection information on the path that is highly likely to be executed later is prefetched, and the cache hit rate of the execution order inspection information may be improved.

Further, the prediction unit 230 may specify the path so as to include three or more code blocks. By pre-reading the execution order inspection information of a multiple steps ahead, the efficiency of reading out the execution order inspection information from the cache may be improved.

Further, the prediction unit 230 predicts the storage area as a prefetch target in accordance with the execution of the inspection instruction of the control flow integrity configured in the first code block and prefetches the predicted storage area from the memory 260 to the cache 250.

Then, the prediction unit 230 determines, when the inspection instruction of the control flow integrity configured in the third code block executed after the first code block is executed, one of the cache 250 and the memory 260 as the access destination based on the prediction auxiliary information in the third code block. Next, the prediction unit 230 acquires the first execution order inspection information that corresponds to the current execution order of the third code block from the determined access destination. At this time, the inspection unit 220 calculates the second execution order inspection information that corresponds to the current execution order of the third code block. Then, the inspection unit 220 inspects whether it is possible to execute a code block executed after the third code block in accordance with the result of comparing the first execution order inspection information acquired by the prediction unit 230 with the calculated second execution order inspection information.

Figure 5:
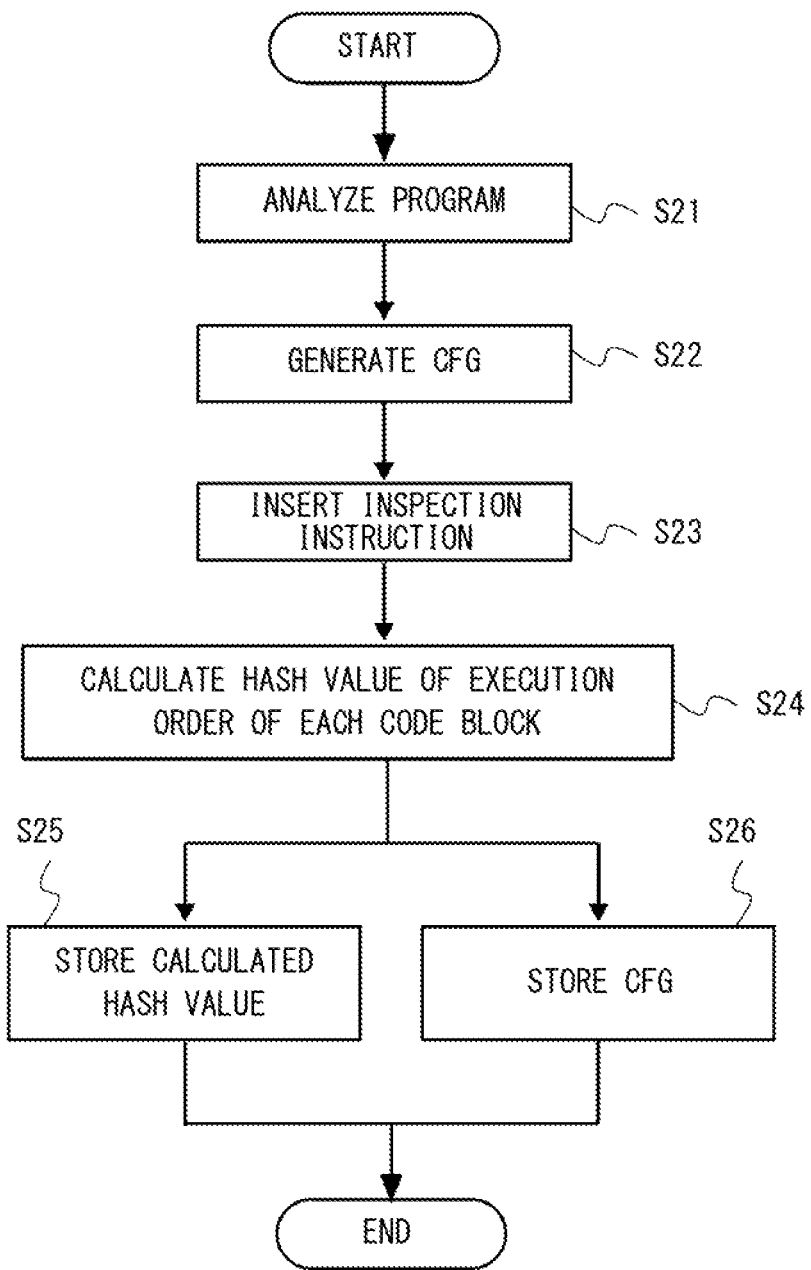
FIG. 5 is a flowchart showing a flow of preliminary processing according to the second example embodiment.

FIG. 5 is a flowchart showing a flow of preliminary processing according to the second example embodiment. The preliminary processing is processing of generating a hash value and a CFG from the program to be executed and storing the generated hash value and CFG. The preliminary processing can be implemented by the device 200 or a desired information processing apparatus. It is assumed in the following description that the preliminary processing is executed by a desired information processing apparatus.

First, the information processing apparatus analyzes the program that will be executed in the device 200 (S21). Then, the information processing apparatus generates a control flow graph (CFG) of this program based on the result of the analysis (S22). Then, the information processing apparatus inserts an inspection instruction into each code block of the program based on the CFG. For example, the inspection instruction is inserted as shown in FIG. 4 described above. When the inspection instruction (processing of calling the inspection unit 220) has already been implemented in the program to be analyzed, Step S23 may be omitted.

Next, the information processing apparatus calculates the hash value of the execution order of each code block based on the CFG (S24). For example, as described above, the information processing apparatus gives an execution order to a predetermined hash function and calculates the hash value. After that, the information processing apparatus associates the calculated hash value with the execution order and stores the associated information as the execution order inspection information in the memory 260 in the device 200 (S25). Further, the information processing apparatus stores the generated CFG in a storage apparatus (not shown) in the device 200 as the control flow graph 240.

Figure 6:
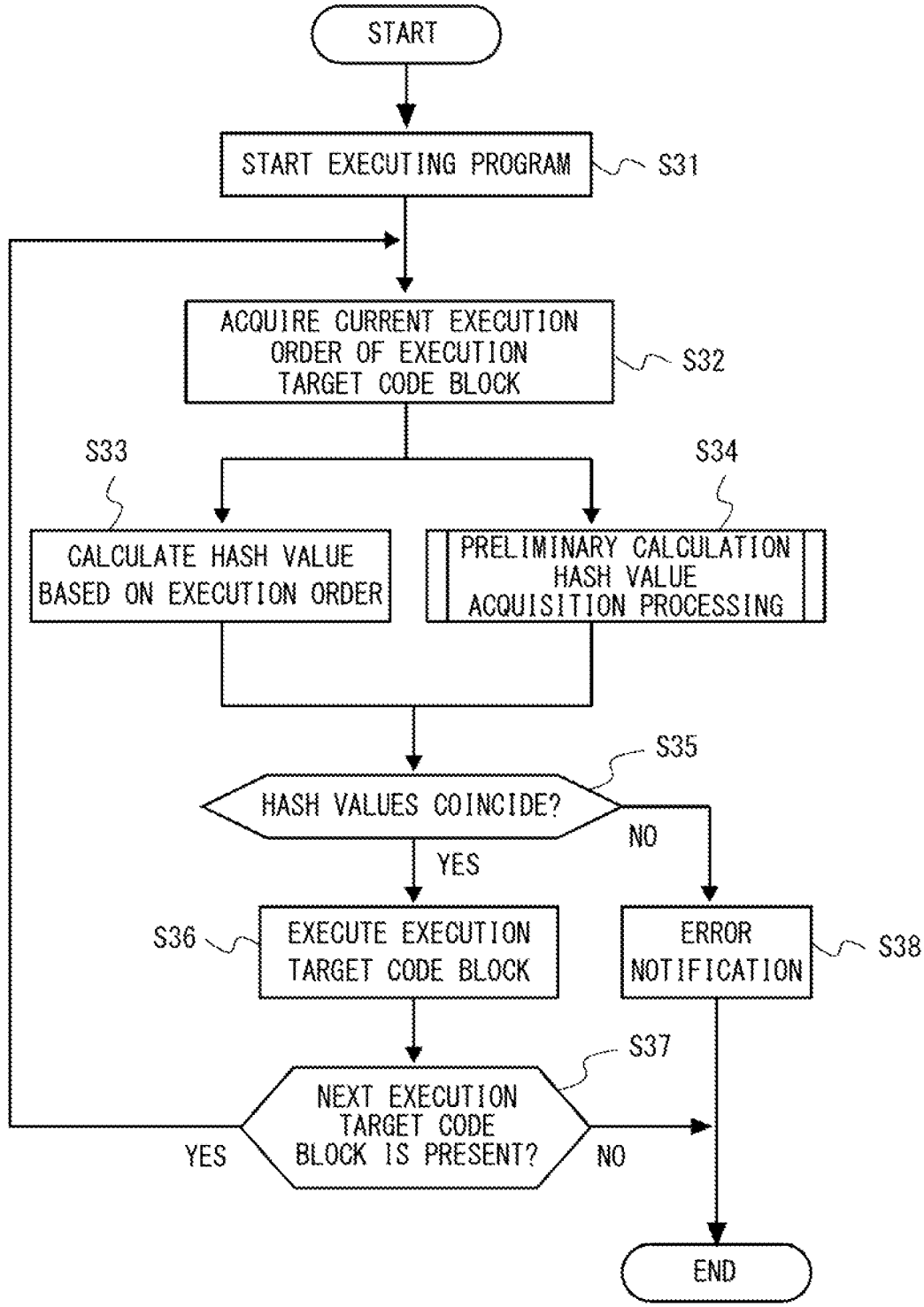
FIG. 6 is a flowchart showing a flow of control flow inspection processing during execution of a program according to the second example embodiment.

FIG. 6 is a flowchart showing a flow of control flow inspection processing during execution of a program according to the second example embodiment. In this example, a case in which control flow inspection processing is performed when a program that has created the CFG and the hash value in the above preliminary processing is executed in the device 200 will be described.

First, the program execution unit 210 starts executing the program (S31). For example, a processor core in the device 200 loads a program to be executed (externally input) into the memory 260 and executes the loaded program.

Next, the program execution unit 210 executes an inspection instruction during the execution of the predetermined code block and calls the inspection unit 220. At this time, the program execution unit 210 further notifies the inspection unit 220 of the current execution order of the code block to be executed. Then, the inspection unit 220 acquires the current execution order of the execution target code block (S32).

Then, the inspection unit 220 calculates a hash value based on the acquired execution order (S33). It is assumed here that the way of calculating the hash value, the hash function to be used, etc. are similar to those in the preliminary processing (Step S24). Further, the inspection unit 220 causes the prediction unit 230 to execute preliminary calculation hash value acquisition processing independently of Step S33 (S34).

Note that the inspection of the control flow may be performed by not using hash values and by directly comparing the execution order of the execution target code block. Specifically, the execution order of the execution target code block may be compared with a pre-defined correct execution order and it may be inspected whether they match each other.

Figure 7:
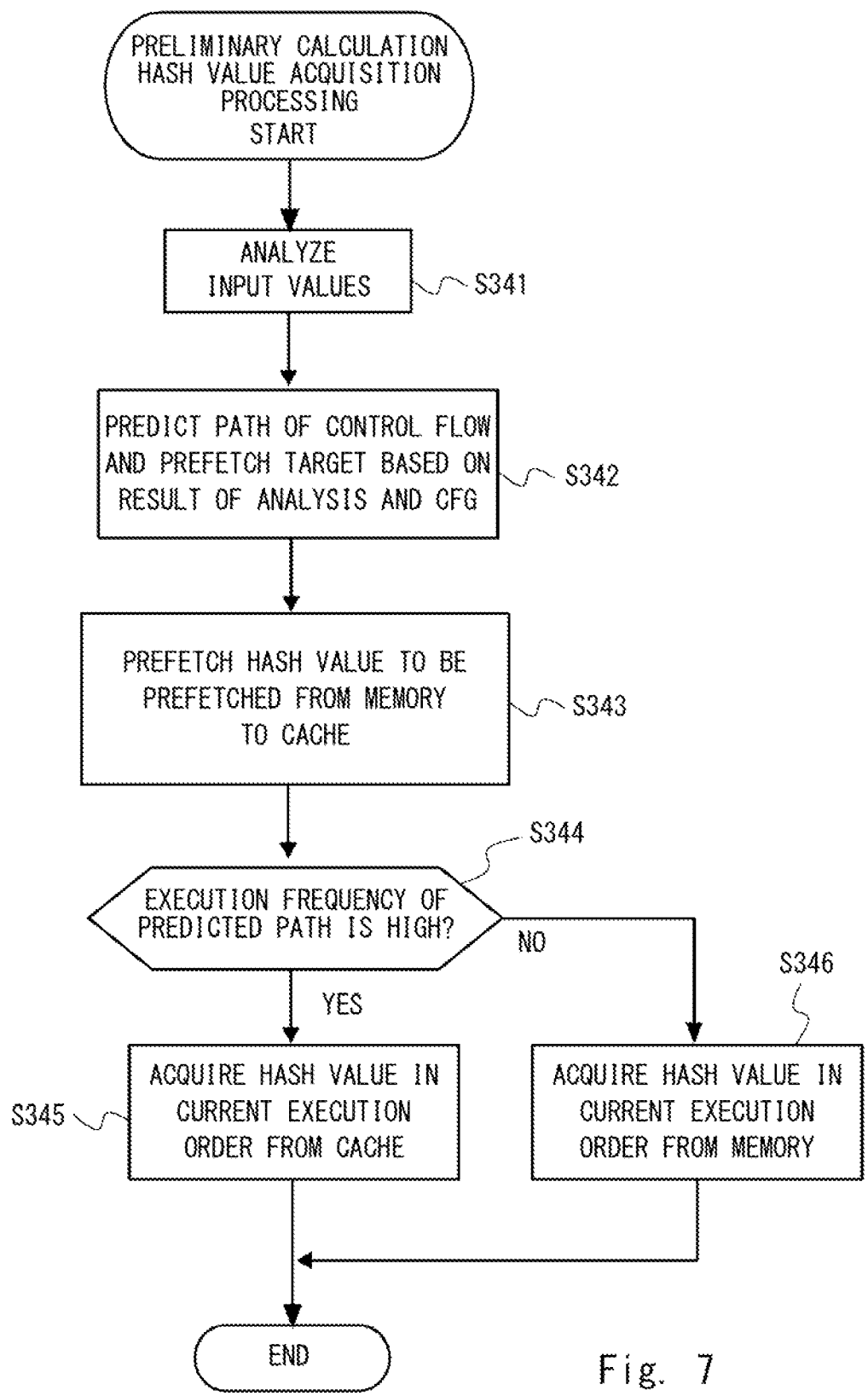
FIG. 7 is a flowchart showing a flow of preliminary calculation hash value acquisition processing according to the second example embodiment.

FIG. 7 is a flowchart showing a flow of preliminary calculation hash value acquisition processing according to the second example embodiment. First, the prediction unit 230 analyzes the input values to the execution target code block (S341). When, for example, the processing of comparing the input values with the predetermined values is implemented in the execution target code block and the subsequent processing (code block) is branched in accordance with the result of the comparison, in Step S341, the prediction unit 230 performs processing of comparing the input values with the predetermined values and determines the results of the comparison to be the result of the analysis. For example, the prediction unit 230 sets the result of comparison indicating that the input value is smaller than or it is equal to or larger than a predetermined value as the result of the analysis. The input values greatly affect the operation of this code block or the subsequent code blocks, including branch determination. By analyzing the input values, for example, buffer overflow can be detected and the code block which is a branch destination, can be predicted more accurately.

Note that the input value is one example of the prediction auxiliary information. Therefore, in Step S341, in addition to the input values or in place of the input values, the internal state variable values when the execution target code block is executed may instead be analyzed. In this case, the prediction unit 230 may acquire the internal state variable values of the execution target code block from the program execution unit 210. Then, the prediction unit 230 may perform processing of comparing the internal state variable values, like the processing performed using the input values, and the result of the comparison is used as the result of the analysis. For example, even when input values are the same, the internal state variable values may be changed every time the processing is repeatedly executed. Therefore, by performing prediction in view of the internal state variable values, the code block which is the branch destination can be predicted more accurately.

Alternatively, in addition to the input values and the internal state variable values, or in place of the input values and the internal state variable values, the priority of execution of paths that may be executed after being branched off from the first code block may instead be analyzed. The priority may be set for each path in preliminary processing in advance. For example, Internet of Thing (IoT) devices strongly require processing be performed in real time. Therefore, a high priority is set in the CFG in advance for a code block in which processing that requires a response to be made within a certain period of time is implemented, whereby it becomes easy to ensure real-time property.

Then, the prediction unit 230 predicts the path of the control flow and the prefetch target based on the result of the analysis and the control flow graph 240 (S342). For example, the prediction unit 230 specifies the second code block which is the branch destination from the first code block that is currently being executed in the control flow graph 240 in accordance with the input values. Note that the branch destination is not limited to a part immediately after the first code block and includes code blocks in a plurality of steps. Then, the prediction unit 230 specifies the path of the control flow from the first code block to the second code block. For example, the specified path may include three or more code blocks.

Figure 8:
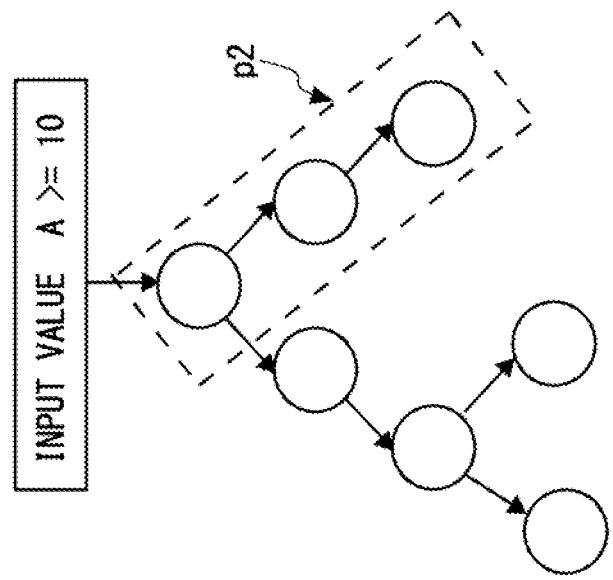
FIG. 8 is a diagram for describing the concept of prediction of a path to be prefetched according to the second example embodiment.
Figure 8:
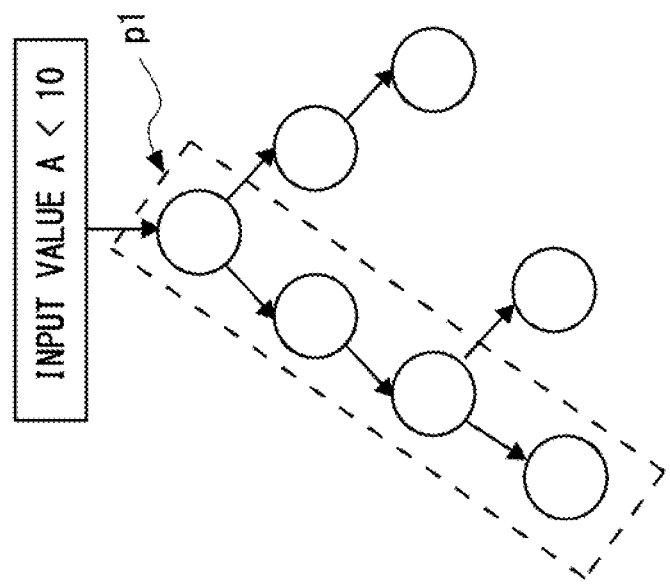

FIG. 8 is a diagram for describing the concept of prediction of the path to be prefetched according to the second example embodiment. FIG. 8 shows that a path p1 is specified when, for example, the input value A is smaller than 10 and a path p2 is specified when the input value A is equal to or larger than 10. The prediction unit 230 may specify the first position of the first code block and the second position of the second code block from the control flow graph 240 and may specify the path from the first position to the second position.

Referring once again to FIG. 7, the explanation will be continued. The prediction unit 230 predicts the specified path as the prefetch target.

Specifically, the prediction unit 230 specifies the storage area of the execution order inspection information that corresponds to the respective code blocks included in the specified path from the memory 260. For example, the prediction unit 230 refers to the control flow graph 240, specifies the execution order that corresponds to the respective code blocks included in the specified path, and searches execution orders 2711 to 27n1 in the memory 260 using the specified execution order as a search key. The prediction unit 230 specifies the address range in the memory 260 which stores the execution order inspection information to which the execution order found by the search belongs as the storage area (prefetch target).

Then, the prediction unit 230 prefetches hash values to be prefetched from the memory 260 to the cache 250 (S343). When, for example, the search finds the execution order 2711, the prediction unit 230 reads out the execution order 2711 and the hash value 2712 from the specified storage area in the memory 260 and writes them into the cache 250. Note that Step S343 may be executed at another timing.

After that, the prediction unit 230 determines whether the execution frequency of the predicted path is high (S344). The execution frequency may indicate, for example, statistical information such as the actual number of executions per unit time, the probability that it is executed or the like. It is further assumed that the threshold of the execution frequency is stored in the device 200 in advance or as the actual number of times the program has been executed. Note that the actual number of times the program has been executed is sequentially updated in accordance with the execution of the program.

When it is determined in Step S344 that the execution frequency is higher than the threshold, the prediction unit 230 acquires the hash value in the current execution order from the cache 250 (S345). The prefetch operation in Step S343 may be executed after Step S345. On the other hand, when it is determined in Step S344 that the execution frequency is not higher than the threshold (equal to or smaller than the threshold), the prediction unit 230 acquires the hash value of the current execution order from the memory 260 (S346).

In Step S342, the prediction unit 230 may predict that the specified path is the prefetch target when the specified path satisfies the following condition. For example, the prediction unit 230 may predict, when the execution frequency of the specified path is higher than those of other paths that may be executed by being branched off from the first code block, the storage area of execution order inspection information that corresponds to the specified path as the prefetch target.

Further, in Step S342, the prediction unit 230 may predict the prefetch target based on whether the execution code is an execution code where delay is allowed instead of predicting the prefetch target based on the execution frequency (S342), and execute the prefetch operation (S343). Specifically, when the execution target code block is generated, a developer specifies whether each code block allows delay. For example, in the case of a code block that is sensitive to a timing, such as device control, the developer specifies that delay should not be allowed. Then, when the prediction unit 230 predicts prefetch, verification information of a code block where it is specified that delay will not be allowed may be preferentially set as a prefetch target.

Figure 9:
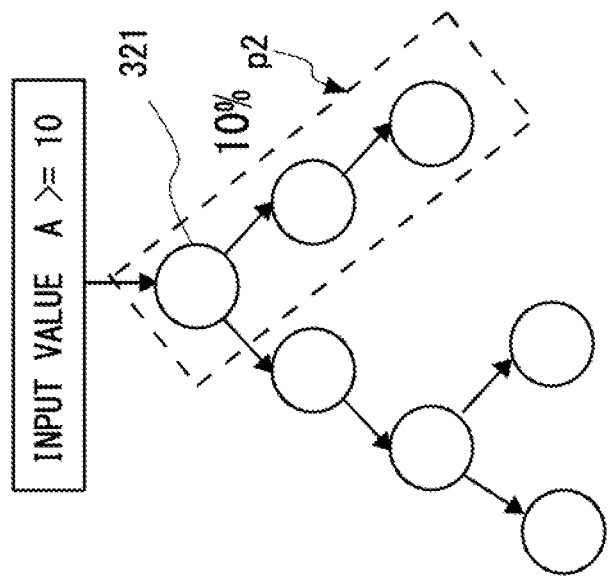
FIG. 9 is a diagram for describing an example of execution frequency of a predicted path according to the second example embodiment.
Figure 9:
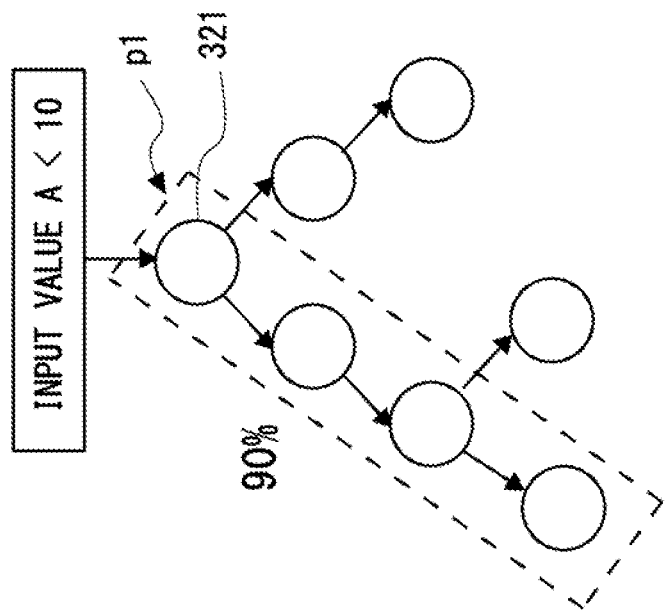

FIG. 9 is a diagram for describing an example of the execution frequency of the predicted path according to the second example embodiment. It is assumed here that the path p1 is known to be executed with the probability of 90% and the path p2 is known to be executed with the probability of 10% for the code block 321 which is the branch source. Then, the path p1 is executed more frequently than the path p2 is, which indicates that the path p1 is predicted as a prefetch target. Note that 90% and 10% are examples of the frequency of execution, and may be the history of the execution count.

Alternatively, the prediction unit 230 may predict, when the number of code blocks included in the specified path is equal to or larger than a predetermined value, the storage area of the execution order inspection information that corresponds to the specified path as the prefetch target. In the case of FIG. 8, for example, the number of code blocks that belong to the path p1 is larger than the number of code blocks that belong to the path p2 and the depth of the path p1 is larger than that of the path p2. Therefore, in such a case, the path p1 may be specified.

Referring once again to FIG. 6, the explanation will be continued. After Steps S33 and S34, the inspection unit 220 determines whether the hash value calculated in Step S33 matches with the hash value acquired in Step S34 (S35). When it is determined that the hash values match each other, the inspection unit 220 outputs information indicating that execution of the execution target code block will be permitted to the program execution unit 210. Then, the program execution unit 210 executes the execution target code block (S36). Then, the program execution unit 210 determines whether the next execution target code block is present (S37). When the next execution target code block is present, the program execution unit 210 calls the inspection unit 220 again when it executes the inspection instruction, the process then proceeds to Step S32, and the following process is repeatedly executed. When it is determined in Step S37 that the next execution target code block is not present, the execution of the program is ended.

On the other hand, when it is determined in Step S35 that the hash values do not match each other, the inspection unit 220 outputs information indicating that execution of the execution target code block will not be allowed (error notification) to the program execution unit 210 (S38). Then, the execution of the program is ended.

Figure 10:
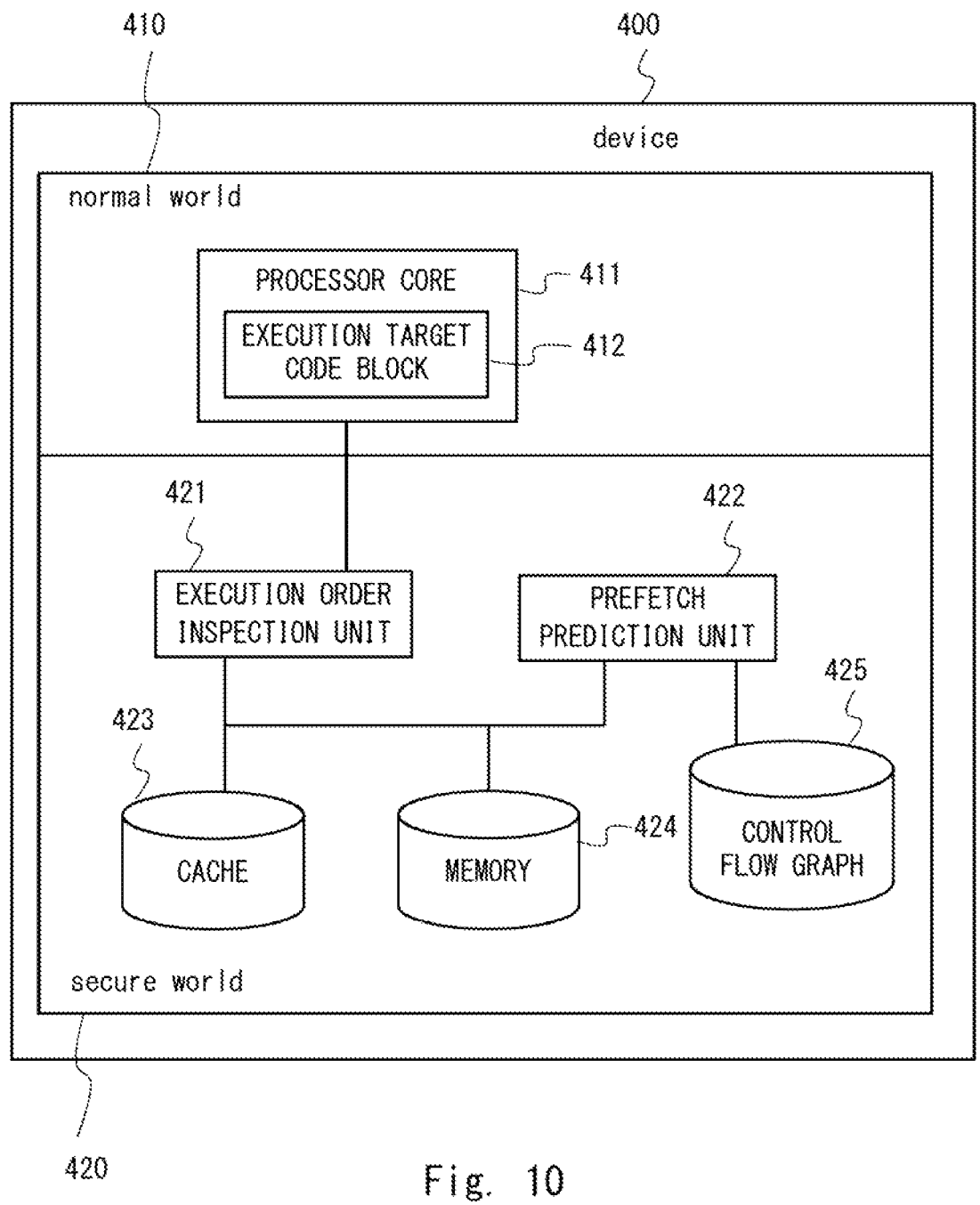
FIG. 10 is a block diagram showing a configuration of an example of a device according to the second example embodiment.

FIG. 10 is a block diagram showing a configuration of an example of a device 400 according to the second example embodiment. The device 400, which is a specific example of the device 200, is, for example, application of Trusted Execution Environment (TEE). The device 400 includes a normal world 410, which is a non-secure area, and a secure world 420, which is a secure area. The normal world 410 includes a processor core 411 as program execution means. It is assumed that the processor core 411 executes an execution target code block 412.

The secure world 420 includes an execution order inspection unit 421, a prefetch prediction unit 422, a cache 423, a memory 424, and a control flow graph 425. The secure world 420 is, for example, a TrustedZone in an ARM (registered trademark) architecture. The execution order inspection unit 421, the prefetch prediction unit 422, the cache 423, the memory 424, and the control flow graph 425 in the secure world 420 respectively correspond to the inspection unit 220, the prediction unit 230, the cache 250, the memory 260, and the control flow graph 240 described above.

The prefetch prediction unit 422 predicts, in accordance with execution of an inspection instruction by the processor core 411, the prefetch target in accordance with the code block in which the inspection instruction is set, and prefetches the prefetch target. Further, the prefetch prediction unit 422 determines that the access destination of the execution order inspection information is the cache 423 or the memory 424 in accordance with the execution of the inspection instruction by the processor core 411, and acquires the first execution order inspection information that corresponds to the current execution order of the code block from the determined access destination.

The execution order inspection unit 421 calculates the second execution order inspection information that corresponds to the current execution order of the code block in accordance with the execution of the inspection instruction by the processor core 411, and compares the first execution order inspection information acquired by the prefetch prediction unit 422 with the calculated second execution order inspection information. The execution order inspection unit 421 inspects whether it is possible to execute code blocks executed after the code block where the inspection instruction is set in accordance with the result of the comparison.

Figure 11:
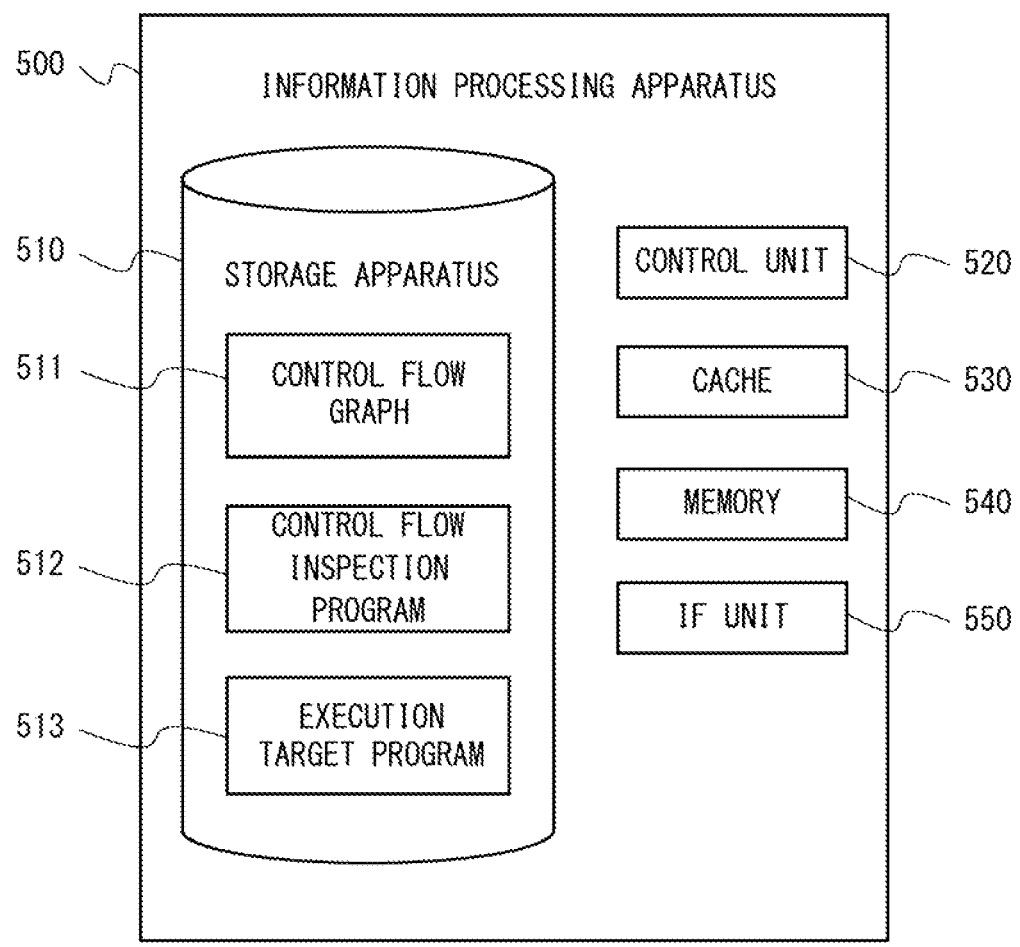
FIG. 11 is a block diagram showing a configuration of an example of an information processing apparatus according to the second example embodiment.

FIG. 11 is a block diagram showing a configuration of the example of an information processing apparatus 500 according to the second example embodiment. The information processing apparatus 500 includes a storage apparatus 510, a control unit 520, a cache 530, a memory 540, and an InterFace (IF) unit 550. The storage apparatus 510 is a non-volatile storage apparatus such as a hard disk or a flash memory. The storage apparatus 510 stores a control flow graph 511, a control flow inspection program 512, and an execution target program 513. The control flow graph 511 corresponds to the aforementioned control flow graph 240. The control flow inspection program 512 is a computer program in which processing of the control flow inspection method according to this example embodiment is implemented.

The cache 530 and the memory 540 are storage areas that respectively correspond to the cache 250 and the memory 260 described above and temporarily hold information when the control unit 520 performs operation. The IF unit 550 is an interface that receives or outputs data from or to a device provided in the outside of the information processing apparatus 500. For example, the IF unit 550 outputs external input data to the control unit 520 and externally outputs data received from the control unit 520.

The control unit 520 is a processor that controls each of the components of the information processing apparatus 500, that is, a control apparatus. For example, the control unit 520 may be one or more processor cores. The control unit 520 loads the control flow inspection program 512 into the memory 540 from the storage apparatus 510 and executes the control flow inspection program 512. Further, the control unit 520 loads the control flow graph 511 and the execution target program 513 into the memory 540 as appropriate from the storage apparatus 510 and executes the loaded control flow graph 511 and the execution target program 513. Accordingly, the control unit 520 implements the functions of the program execution unit 210, the inspection unit 220 and the prediction unit 230, or the execution order inspection unit 421 and the prefetch prediction unit 422. Note that the control unit 520 is preferably a CPU that includes a Trusted Execution Environment (TEE). In this case, it can be said that the control flow inspection program 512 according to this example embodiment is executed on the CPU including the TEE.

Other Example Embodiments

In the above example embodiments, each of the components shown in the drawings as functional blocks which perform various kinds of processing can be configured by a Central Processing Unit (CPU), a memory, or another circuit in terms of hardware, and is achieved by a program or the like that the CPU loads into the memory and executes the loaded program in terms of software. Accordingly, it will be understood by those skilled in the art that these functional blocks can be implemented in various forms by only hardware, only software or a combination thereof. They are not limited to any one of them.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc-Read Only Memory (CD-ROM), CD-Recordable (CD-R), CD-ReWritable (CD-R/W), and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above example embodiments and may be changed as appropriate without departing from the spirit of the present disclosure. Further, the present disclosure may be executed by combining some of example embodiments as appropriate.

The whole or part of the example embodiments disclosed above can be described as, but not limited to, the following supplementary notes.

(Supplementary Note A1)

A semiconductor device comprising:

first storage means for storing, in advance, a plurality of pieces of execution order inspection information used for inspection of an execution order of a plurality of code blocks in a predetermined program;

second storage means, which is a cache for the first storage means; and prediction means for predicting a storage area of the execution order inspection information based on prediction auxiliary information in a first code block of the plurality of code blocks and a control flow graph of the program, the storage area being a prefetch target to be prefetched from the first storage means to the second storage means.

(Supplementary Note A2)

The semiconductor device according to Supplementary Note A1, wherein the prediction means:

specifies a second code block that may be executed after the first code block based on the prediction auxiliary information and the control flow graph;

specifies a path of a control flow from the first code block to the second code block; and predicts the storage area of the execution order inspection information that corresponds to the specified path as the prefetch target.

(Supplementary Note A3)

The semiconductor device according to Supplementary Note A2, wherein the prediction means:

specifies a first position of the first code block in the program based on the control flow graph; and specifies a second position included in a control flow from the first position as the second code block based on the result of the analysis of the prediction auxiliary information and the control flow graph.

(Supplementary Note A4)

The semiconductor device according to Supplementary Note A2 or A3, wherein the prediction means predicts, when the execution frequency of the specified path is higher than those of other paths that may be executed by being branched off from the first code block, the storage area of the execution order inspection information that corresponds to the specified path as the prefetch target.

(Supplementary Note A5)

The semiconductor device according to any one of Supplementary Notes A2 to A4, wherein the prediction means predicts, when the number of code blocks included in the specified path is equal to or larger than a predetermined value, the storage area of the execution order inspection information that corresponds to the specified path as the prefetch target.

(Supplementary Note A6)

The semiconductor device according to any one of Supplementary Notes A2 to A5, wherein the prediction means specifies the path so as to include three or more code blocks.

(Supplementary Note A7)

The semiconductor device according to any one of Supplementary Notes A1 to A6, wherein the prediction auxiliary information includes at least one of an input value to the first code block, an internal state variable value at the time of execution of the first code block, and the priority of execution of paths that may be executed by being branched off from the first code block.

(Supplementary Note A8)

The semiconductor device according to any one of Supplementary Notes A1 to A7, wherein the execution order inspection information includes a hash value calculated based on a path of a control flow regarding two or more of the plurality of code blocks.

(Supplementary Note A9)

The semiconductor device according to any one of Supplementary Notes A1 to A8, wherein the prediction means:

predicts the storage area as the prefetch target in accordance with execution of an inspection instruction of control flow integrity configured in the first code block;

prefetches the predicted storage area from the first storage means to the second storage means; and determines, at a time of execution of an inspection instruction of control flow integrity configured in a third code block that has been executed after the first code block, an access destination to be one of the first storage means and the second storage means based on the prediction auxiliary information in the third code block, and acquires first execution order inspection information that corresponds to the current execution order of the third code block from the determined access destination, and the semiconductor device further comprises inspection means for calculating second execution order inspection information that corresponds to the current execution order of the third code block and inspecting whether it is possible to execute a code block executed after the third code block in accordance with the result of comparing the acquired first execution order inspection information with the calculated second execution order inspection information.

(Supplementary Note A10)

The semiconductor device according to Supplementary Note A9, wherein the semiconductor device includes a secure area and a non-secure area, the secure area includes the first storage means, the second storage means, the prediction means, and the inspection means, the non-secure area includes program execution means, the prediction means predicts, in accordance with the execution of the inspection instruction by the program execution means, the prefetch target in accordance with a fourth code block in which the inspection instruction is set, prefetches the prefetch target, determines an access destination to be one of the first storage means and the second storage means based on the prediction auxiliary information in the fourth code block, and acquires third execution order inspection information that corresponds to the current execution order of the fourth code block from the determined access destination, and the inspection means inspects whether it is possible to execute a code block executed after the code block in which the inspection instruction is set in accordance with the execution of the inspection instruction by the program execution means.

(Supplementary Note B1)

A control flow inspection method, wherein a computer comprising:

first storage means for storing, in advance, a plurality of pieces of execution order inspection information used for inspection of an execution order of a plurality of code blocks in a predetermined program;

second storage means, which is a cache for the first storage means; and acquires prediction auxiliary information in a first code block of the plurality of code blocks and a control flow graph of the program; and predicts a storage area of the execution order inspection information based on the prediction auxiliary information and the control flow graph, the storage area being a prefetch target to be prefetched from the first storage means to the second storage means.

(Supplementary Note C1)

A non-transitory computer readable medium storing a control flow inspection program causing a computer comprising:

first storage means for storing, in advance, a plurality of pieces of execution order inspection information used for inspection of an execution order of a plurality of code blocks in a predetermined program; and second storage means, which is a cache for the first storage means, to execute:

processing of acquiring prediction auxiliary information in a first code block of the plurality of code blocks and a control flow graph of the program; and processing of predicting a storage area of the execution order inspection information based on the prediction auxiliary information and the control flow graph, the storage area being a prefetch target to be prefetched from the first storage means to the second storage means.

(Supplementary Note D1)

An electronic device comprising the semiconductor device according to any one of Supplementary Notes A1 to A10.

While the present application has been described with reference to the example embodiments (and the Example), the present application is not limited to the above example embodiments (and the Example). Various changes that those skilled in the art may understand within the scope of the present application can be made to the configurations and the details of the present application.

REFERENCE SIGNS LIST

100 Semiconductor Device
110 First Storage Unit
111 Execution Order Inspection Information
11$n$ Execution Order Inspection Information
120 Second Storage Unit
130 Prediction Unit
200 Device
210 Program Execution Unit
211 Execution Target Code Block
212 Inspection Instruction
220 Inspection Unit
230 Prediction Unit
240 Control Flow Graph
250 Cache
260 Memory
270 Execution Order Inspection Information
2701 Execution Order
2702 Hash Value
271 Execution Order Inspection Information
2711 Execution Order
2712 Hash Value
27$n$ Execution Order Inspection Information
27$n$1 Execution Order
27$n$2 Hash Value
31 Module
32 Code Block
33 Inspection Instruction
p1 Path
p2 Path
400 Device
410 Normal World
411 Processor Core
412 Execution Target Code Block
420 Secure World
421 Execution Order Inspection Unit
422 Prefetch Prediction Unit
423 Cache
424 Memory
425 Control Flow Graph
500 Information Processing Apparatus
510 Storage Apparatus
511 Control Flow Graph
512 Control Flow Inspection Program
513 Execution Target Program
520 Control Unit
530 Cache
540 Memory
550 IF Unit

What is claimed is:

1. A semiconductor device comprising:
   first storage apparatus configured to store, in advance, a plurality of pieces of execution order inspection information used for inspection of an execution order of a plurality of code blocks in a predetermined program;
   second storage apparatus, which is a cache for the first storage apparatus;
   at least one memory configured to store instructions, and
   at least one processor configured to execute the instructions to:
   predict a storage area of the execution order inspection information based on prediction auxiliary information in a first code block of the plurality of code blocks and a control flow graph of the program, the storage area being a prefetch target to be prefetched from the first storage apparatus to the second storage apparatus, and the storage area being predicted as the prefetch target in accordance with execution of an inspection instruction of control flow integrity configured in the first code block;
   prefetch the predicted storage area from the first storage apparatus to the second storage apparatus;
   determine, at a time of execution of an inspection instruction of control flow integrity configured in a third code block that has been executed after the first code block, an access destination to be one of the first storage apparatus and the second storage apparatus based on the prediction auxiliary information in the third code block, and acquire first execution order inspection information that corresponds to the current execution order of the third code block from the determined access destination; and
   calculate second execution order inspection information that corresponds to the current execution order of the third code block and inspect whether it is possible to execute a code block executed after the third code block in accordance with the result of comparing the acquired first execution order inspection information with the calculated second execution order inspection information.

2. The semiconductor device according to claim 1, wherein the at least one processor further configured to execute the instructions to
   specify a second code block that may be executed after the first code block based on the prediction auxiliary information and the control flow graph;
   specify a path of a control flow from the first code block to the second code block; and
   predict the storage area of the execution order inspection information that corresponds to the specified path as the prefetch target.

3. The semiconductor device according to claim 2, wherein the at least one processor further configured to execute the instructions to
   specify a first position of the first code block in the program based on the control flow graph; and
   specify a second position included in a control flow from the first position as the second code block based on the result of the analysis of the prediction auxiliary information and the control flow graph.

4. The semiconductor device according to claim 2, wherein the at least one processor further configured to execute the instructions to
   predict, when the execution frequency of the specified path is higher than those of other paths that may be executed by being branched off from the first code block, the storage area of the execution order inspection information that corresponds to the specified path as the prefetch target.

5. The semiconductor device according to claim 2, wherein the at least one processor further configured to execute the instructions to
   predict, when the number of code blocks included in the specified path is equal to or larger than a predetermined value, the storage area of the execution order inspection information that corresponds to the specified path as the prefetch target.

6. The semiconductor device according to claim 2, wherein the at least one processor further configured to execute the instructions to
   specify the path so as to include three or more code blocks.

7. The semiconductor device according to claim 1, wherein the prediction auxiliary information includes at least one of an input value to the first code block, an internal state variable value at the time of execution of the first code block, and the priority of execution of paths that may be executed by being branched off from the first code block.

8. The semiconductor device according to claim 1, wherein the execution order inspection information includes a hash value calculated based on a path of a control flow regarding two or more of the plurality of code blocks.

9. The semiconductor device according to claim 1, wherein
   the semiconductor device includes a secure area and a non-secure area,
   the secure area includes the at least one memory, the first storage apparatus, the second storage apparatus, a prediction circuitry, an inspection circuitry, and
   the non-secure area includes the at least one processor,
   the prediction circuitry configured to predict, in accordance with the execution of the inspection instruction by the at least one processor, the prefetch target in accordance with a fourth code block in which the inspection instruction is set, prefetch the prefetch target, determine an access destination to be one of the first storage apparatus and the second storage apparatus based on the prediction auxiliary information in the fourth code block, and acquire third execution order inspection information that corresponds to the current execution order of the fourth code block from the determined access destination, and
   the inspection circuitry configured to inspect whether it is possible to execute a code block executed after the code block in which the inspection instruction is set in accordance with the execution of the inspection instruction by the at least one processor.

10. An electronic device comprising the semiconductor device according to claim 1.

11. A control flow inspection method, wherein
    a computer comprising:
    first storage apparatus for storing, in advance, a plurality of pieces of execution order inspection information used for inspection of an execution order of a plurality of code blocks in a predetermined program; and
    second storage apparatus, which is a cache for the first storage apparatus,
    acquires prediction auxiliary information in a first code block of the plurality of code blocks and a control flow graph of the program;
    predicts a storage area of the execution order inspection information based on the prediction auxiliary information and the control flow graph, the storage area being a prefetch target to be prefetched from the first storage apparatus to the second storage apparatus, and the storage area being predicted as the prefetch target in accordance with execution of an inspection instruction of control flow integrity configured in the first code block;

prefetches the predicted storage area from the first storage apparatus to the second storage apparatus;

determines, at a time of execution of an inspection instruction of control flow integrity configured in a third code block that has been executed after the first code block, an access destination to be one of the first storage apparatus and the second storage apparatus based on the prediction auxiliary information in the third code block, and acquire first execution order inspection information that corresponds to the current execution order of the third code block from the determined access destination; and calculates second execution order inspection information that corresponds to the current execution order of the third code block and inspect whether it is possible to execute a code block executed after the third code block in accordance with the result of comparing the acquired first execution order inspection information with the calculated second execution order inspection information.

12. A non-transitory computer readable medium storing a control flow inspection program causing a computer comprising:

first storage apparatus for storing, in advance, a plurality of pieces of execution order inspection information used for inspection of an execution order of a plurality of code blocks in a predetermined program; and second storage apparatus, which is a cache for the first storage apparatus, to execute:

processing of acquiring prediction auxiliary information in a first code block of the plurality of code blocks and a control flow graph of the program;

processing of predicting a storage area of the execution order inspection information based on the prediction auxiliary information and the control flow graph, the storage area being a prefetch target to be prefetched from the first storage apparatus to the second storage apparatus, and the storage area being predicted as the prefetch target in accordance with execution of an inspection instruction of control flow integrity configured in the first code block;

processing of prefetching the predicted storage area from the first storage apparatus to the second storage apparatus;

processing of determining, at a time of execution of an inspection instruction of control flow integrity configured in a third code block that has been executed after the first code block, an access destination to be one of the first storage apparatus and the second storage apparatus based on the prediction auxiliary information in the third code block, and acquire first execution order inspection information that corresponds to the current execution order of the third code block from the determined access destination; and processing of calculating second execution order inspection information that corresponds to the current execution order of the third code block and inspect whether it is possible to execute a code block executed after the third code block in accordance with the result of comparing the acquired first execution order inspection information with the calculated second execution order inspection information.

\* \* \* \* \*